US006892129B2

(12) United States Patent
Miyano

(10) Patent No.: US 6,892,129 B2
(45) Date of Patent: May 10, 2005

(54) VEHICLE ELECTRONIC CONTROL SYSTEM AND METHOD HAVING FAIL-SAFE FUNCTION

(75) Inventor: Hidemasa Miyano, Obu (JP)

(73) Assignees: Denso Corporation, Kariya (JP); Toyota Jidosha Kabushiki Kaisha, Aichi-ken (JP)

( * ) Notice: Subject to any disclaimer, the term of this patent is extended or adjusted under 35 U.S.C. 154(b) by 86 days.

(21) Appl. No.: 10/289,336

(22) Filed: Nov. 7, 2002

(65) Prior Publication Data

US 2003/0144778 A1 Jul. 31, 2003

(30) Foreign Application Priority Data

Jan. 28, 2002 (JP) ........................................ 2002-018651

(51) Int. Cl.[7] ............................ G06F 19/00; G06F 7/00

(52) U.S. Cl. ......................... 701/107; 701/33; 701/102; 701/114; 711/104; 123/295; 123/396; 700/1; 700/2; 700/3; 700/9; 700/20

(58) Field of Search ............................. 701/29, 33, 35, 701/102, 107, 114, 115; 711/104; 123/295, 396; 700/1–3, 9, 20, 21, 26

(56) References Cited

U.S. PATENT DOCUMENTS 5,047,944 A 9/1991 Ishikawa et al. ............ 701/114
5,966,305 A * 10/1999 Watari et al. ................. 700/82
5,983,854 A * 11/1999 Machida et al. ............ 123/295
6,334,084 B1 * 12/2001 Moteki et al. .............. 701/114
6,366,839 B1 * 4/2002 Sato ............................ 701/29
6,678,586 B2 * 1/2004 Nakamoto et al. ............. 701/1
2001/0008987 A1 * 7/2001 Wada et al. .................. 701/29
2002/0035650 A1 * 3/2002 Nakamoto et al. ............. 710/5
2002/0040261 A1 * 4/2002 Nakamoto et al. ............. 701/1

FOREIGN PATENT DOCUMENTS

JP 6-108906 4/1994
JP 7-119522 5/1995

* cited by examiner

*Primary Examiner*—Thomas G. Black
*Assistant Examiner*—Ronnie Mancho
(74) *Attorney, Agent, or Firm*—Nixon & Vanderhye P.C.

(57) ABSTRACT

A vehicle electronic control system has a control CPU and a monitor CPU. The control CPU performs a fail-safe processing thereby to reduce an engine output torque, when the monitor CPU monitoring the control CPU detects that the control CPU fails to perform throttle control for an engine. When the monitor CPU detects that the control CPU fails to perform the fail-safe processing, it performs a fail-safe processing in place of the control CPU. In this fail-safe processing, the monitor CPU continues to reset the control CPU so that the engine may be forcibly stopped.

27 Claims, 4 Drawing Sheets

VEHICLE ELECTRONIC CONTROL SYSTEM AND METHOD HAVING FAIL-SAFE FUNCTION

CROSS REFERENCE TO RELATED APPLICATION

This application is based on and incorporates herein by reference Japanese Patent Application No. 2002-18651 filed on Jan. 28, 2002.

FIELD OF THE INVENTION

The present invention relates to a vehicle electronic control system, which performs a fail-safe operation upon occurrence of an electronic control failure.

BACKGROUND OF THE INVENTION

Two central processing units (CPUs) have been used to control an internal combustion engine in a vehicle, one being for an injection control and an ignition control as a main CPU, and the other being for a throttle control as a sub-CPU. The main CPU monitors the throttle control operation of the sub-CPU, and performs a fail-safe operation when a failure occurs in the throttle control. It has been proposed to perform all of those controls by one CPU, because CPUs have become more capable in respect of processing speed and the like. However, another CPU is used as a sub-CPU to monitor the operation of the main CPU which performs the injection, ignition and throttle controls.

If the sub-CPU detects a failure in the throttle control operation for instance, the sub-CPU instructs the main CPU to perform a fail-safe operation. This fail-safe operation may include maintaining fuel injection and ignition for a reduced number of cylinders of an engine for a limp-home travel of a vehicle. However, it is not certain whether the main CPU, which is involved in the throttle control, is still capable of performing the fail-safe processing properly. Although the sub-CPU may be constructed to reset the main CPU, it is not certain whether the main CPU can perform the fail-safe operation after resetting.

SUMMARY OF THE INVENTION

It is therefore an object of the present invention to provide a vehicle electronic control system and method, which performs a fail-safe operation properly upon occurrence of failure.

According to the present invention, a vehicle electronic control system has a main CPU and a sub-CPU. The main CPU performs an electronic control of a vehicle such as a throttle control for an engine and fail-safe processing to reduce an output torque of the engine when the sub-CPU detects a failure of the main CPU in the electronic control of a vehicle. The sub-CPU determines whether the fail-safe processing is performed properly by the main CPU, and performs a fail-safe processing in place of the main CPU upon determining an abnormality in the fail-safe processing of the main CPU.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
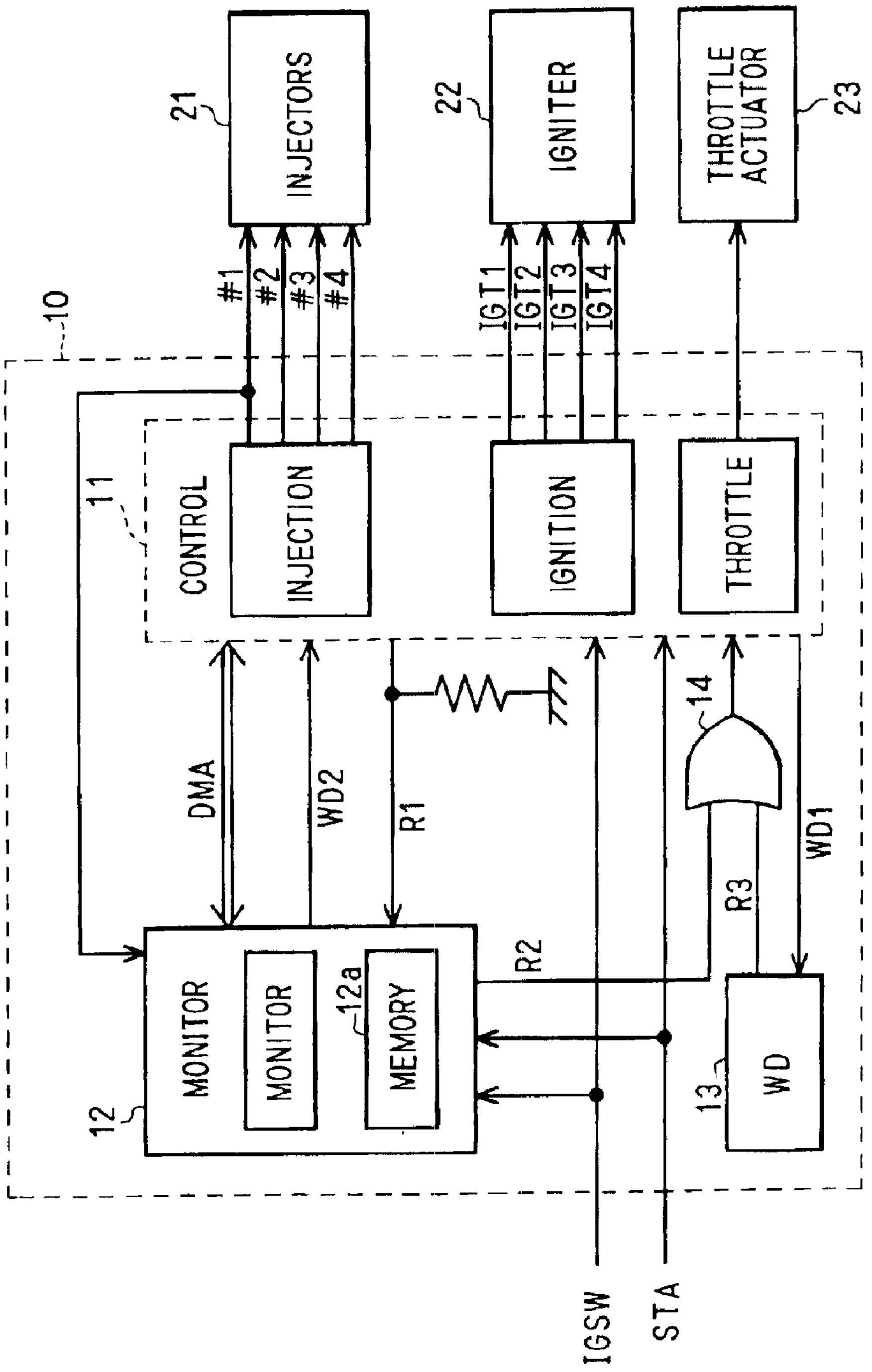
FIG. 1 is a block diagram showing a vehicle electronic control system using a control CPU and a monitor CPU according to an embodiment of the present invention.

Referring to FIG. 1, a vehicle electronic control system has an electronic control unit (ECU) 10, which electronically controls various engine devices such as injectors 21 for fuel injection, an igniter 22 for spark ignition and a throttle actuator for throttle drive, based on engine conditions such as engine speed and intake air quantity. Injection control signals for the four cylinders are designated as #1 to #4, and ignition control signals are designated as IGT1 to IGT4.

The ECU 10 includes a control CPU 11 used as a main CPU, and a monitor CPU 12 used as a sub-CPU, and a watchdog circuit 13. The control CPU 11 and the monitor CPU 12 receive an ignition switch signal IGSW and a starter signal STA to determine engine starting conditions. The control CPU 11 and the monitor CPU 12 are constructed to output watchdog pulses WD1 and WD2 at every predetermined cycles to the watchdog circuit 13 and the control CPU 12, respectively.

The control CPU 11 is programmed to perform a fuel injection control, an ignition control and a throttle control. It is further programmed to perform monitoring of the operations of the monitor CPU 12 by receiving the watchdog pulses WD2 of the monitor CPU 12. The control CPU 11 is programmed to determine a failure of the monitor CPU 12 if the watchdog pulse WD2 remains at the same signal lever for more than a predetermined time period, and to output a reset signal R1 to the monitor CPU 12 upon determination of the failure.

The watchdog circuit 13 is constructed to perform monitoring the CPU 11 by receiving the watchdog pulses WD1 of the control CPU 11. It outputs a reset signal R3 to the control CPU 11 if the watchdog pulse WD1 remains at the same signal level for more than a predetermined time period. It is noted that the monitor CPU 12 is also reset, when the control CPU 11 is reset by the reset signal R3 through an OR gate 14.

The control CPU 11 and the monitor CPU 12 are connected via a communication line of direct memory access (DMA) to be able to communicate each other. The monitor CPU 12 is programmed to perform monitoring of the specific control operation, particularly the throttle control, of the control CPU 11, based on the communication data received from the control CPU 11 through the DMA communication. The monitor CPU 12 notifies the control CPU 11 of the failure in the monitored throttle control via the DMA communication, if it detects the failure. The control CPU 11 is programmed to perform predetermined fail-safe processing in response to the notification of the failure from the monitor CPU 12. The fail-safe processing may be reducing fuel supply to the cylinders or delaying ignition timing for reducing the engine output torque while maintaining a limp-home travel of the vehicle.

The monitor CPU 12 is further programmed to monitor the fail-safe processing performed by the control CPU 11 thereby to check whether the control CPU 11 performs the fail-safe processing properly. In this instance, for example, the monitor CPU 12 may receive the injection signal #1 and monitor the fuel supply condition, that is, fuel cut-off for the output torque reduction. It is of course possible to receive more than one or all of the injection signals #1 to #4 to monitor the fail-safe processing. If any failure in the fail-safe processing of the control CPU 11, the monitor CPU 12 sets an engine stop request flag and stores it in a non-volatile memory 12*a*. The monitor CPU 12 outputs a reset signal R2 as an engine stop request signal to the control CPU 12 through the OR gate 14 so that the operations of the injectors 21, igniter 22 and throttle actuator 23 are stopped.

Figure 2:
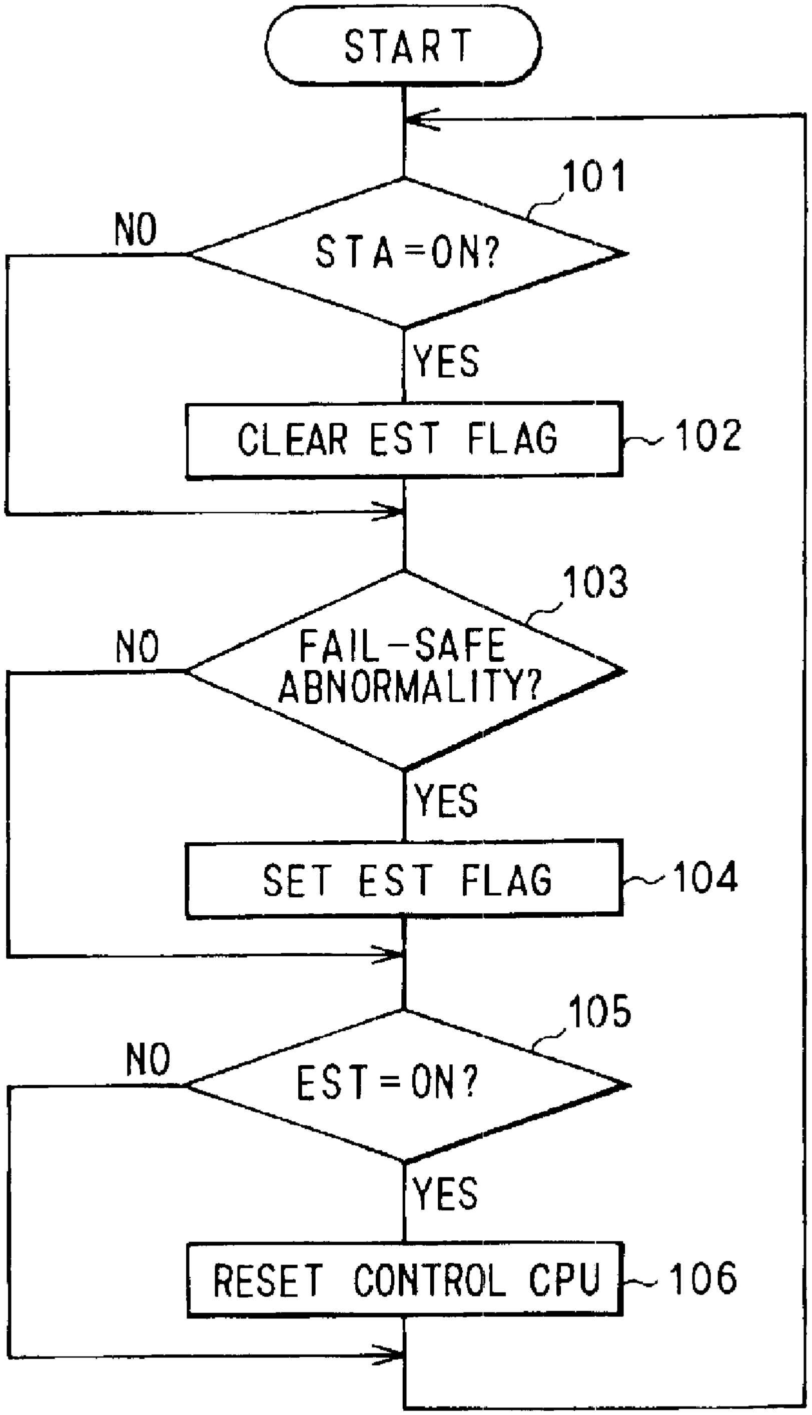
FIG. 2 is a flow diagram showing fail-safe processing monitoring routine executed by the monitor CPU in the embodiment.

More specifically, the monitor CPU 12 monitors the fail-safe processing performed by the control CPU 11 based on the program shown in FIG. 2. The monitor CPU 12 first checks at step 101 whether the starter signal STA is ON indicating engine starting operation. If the flag is ON, the monitor CPU 12 clears at step 102 the engine stop request flag EST stored in the memory 12*a*.

The monitor CPU 12 then checks at step 103 whether the control CPU 11 is performing the fail-safe processing properly. If any failure or abnormality in the processing is detected, the monitor CPU 12 sets the engine stop request flag EST in the memory 12*a* at step 104. The monitor CPU 12 then checks at step 105 whether the engine stop request flag EST is set. If the flag EST is set, the monitor CPU 12 outputs the reset signal R2 as the engine stop request signal thereby to reset the control CPU 11 for stopping the engine operation.

Figure 3:
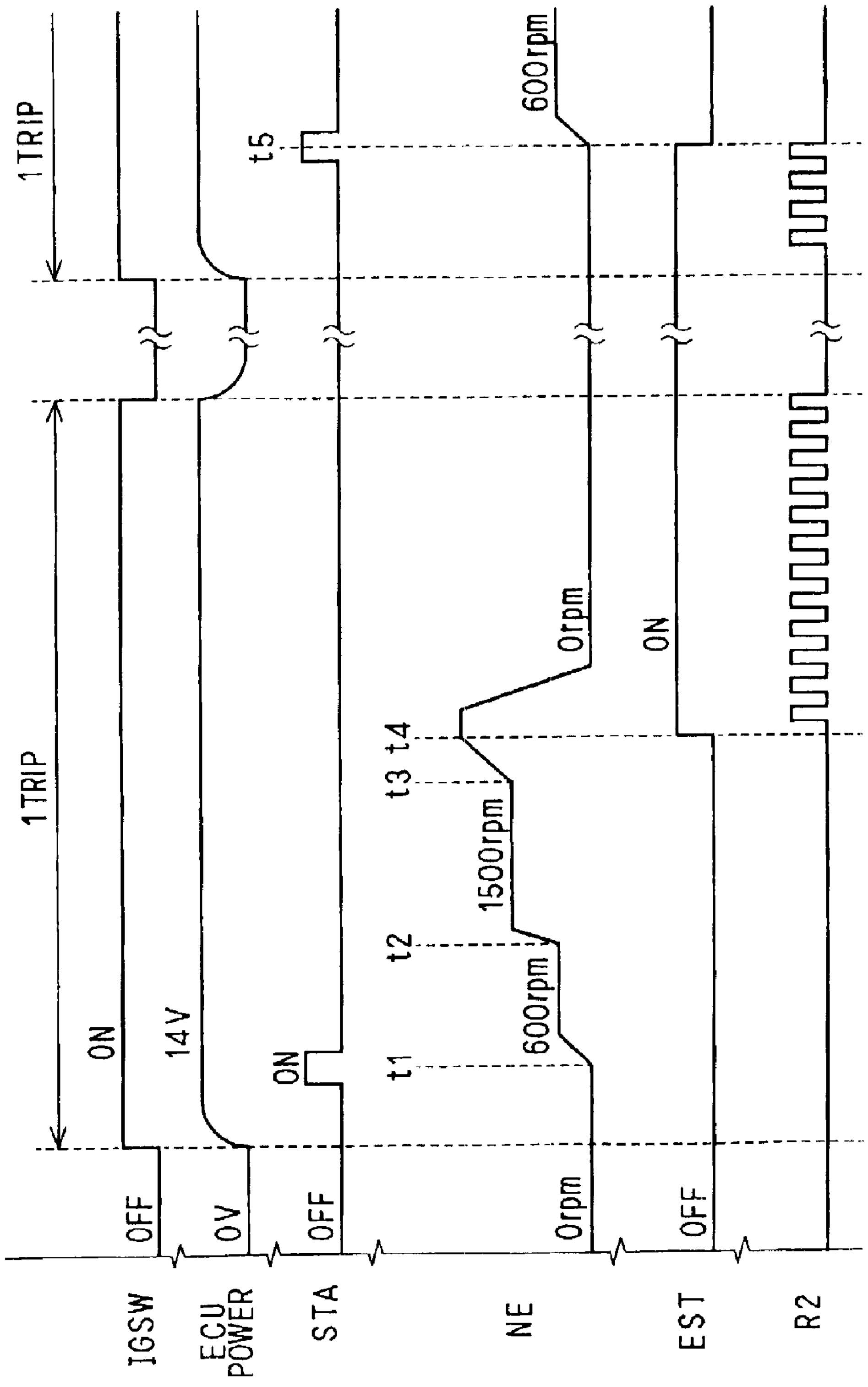
FIG. 3 is a timing diagram showing a fail-safe monitoring operation in the embodiment.

The fail-safe processing monitoring operation is shown in FIG. 3, in which the engine is assumed to be started from the rest condition. When the ignition switch is turned on (IGSW=ON) to start electric power supply and then the starter is energized (STA=ON) at time point t1, the engine rotation speed NE is maintained at the idling speed, about 600 rpm. If a failure occurs in the throttle control, the monitor CPU 12 determines that the control CPU 11 has a failure in the throttle control and notifies it to the control CPU 11. The control CPU 11 responsively starts the fail-safe processing, that is, the reduction of the number of cylinders to which fuel is supplied, so that the engine speed may be maintained at about 1,500 rpm with which the vehicle is enabled to move to a repair shop, for instance, as a limp-home operation.

If a failure or abnormality occurs in the fail-safe operation by the control CPU 11 at time point t3, that is, the reduction of the number of cylinders to which fuel is supplied is not performed properly, the engine speed NE rises further. The monitor CPU 12 detects this abnormality and sets the engine stop flag (EST=ON) at time point t4. It also outputs the reset signal R2 to the control CPU 11. The monitor CPU 12 is also reset each time the control CPU 11 is reset. However, the engine stop request flag EST is held stored in the nonvolatile memory 12*a*. Therefore, even when the monitor CPU 12 is restarted, the reset signal R2 is output to the control CPU 11 repeatedly until the ignition switch is turned off (IGSW=OFF) to stop the power supply to the ECU 10.

If the ignition switch is turned on again, the reset signal R2 is continued to be output from the monitor CPU 12 due to the engine stop request flag EST stored in the memory 12*a*. Upon starting the engine starting operation (STA=ON) at time point t5, the flag EST in the memory 12*a* is cleared so that the engine is normally controlled by the control CPU 11 unless the monitor CPU 12 detects failure in the throttle control operation of the control CPU 11.

According to this embodiment, if the control CPU 11 fails to perform the fail-safe processing properly, the monitor CPU 12 detects it and continues to reset the control CPU 11 so that the engine speed rises excessively. This is particularly advantageous, because it is not certain whether the control CPU 11 is capable of performing the fail-safe processing as required after it failed to perform its engine control, particularly throttle control. Since the engine stop request flag EST is cleared at each starting operation of the engine, the control CPU 11 is enabled to perform the engine control normally.

Figure 4A:
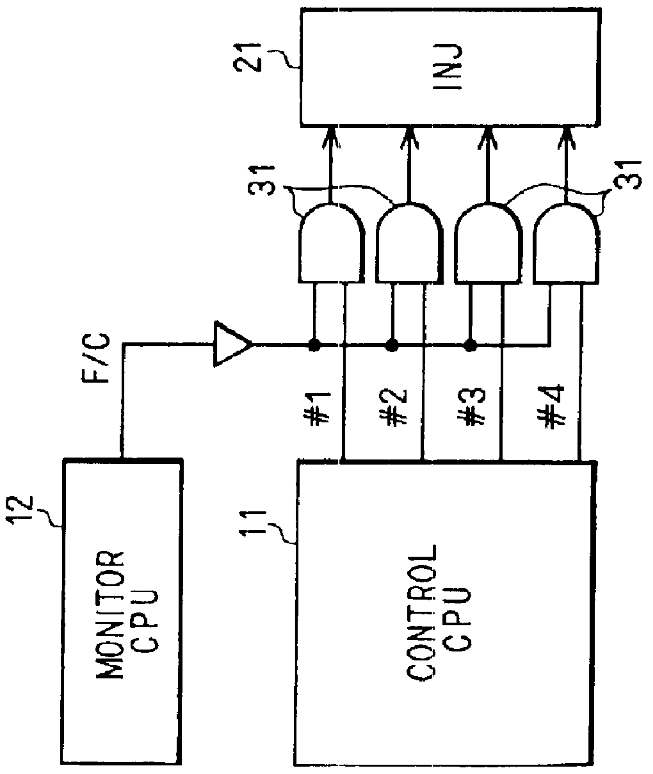
FIGS. 4A and 4B are block diagrams showing modifications of the embodiment.
Figure 4B:
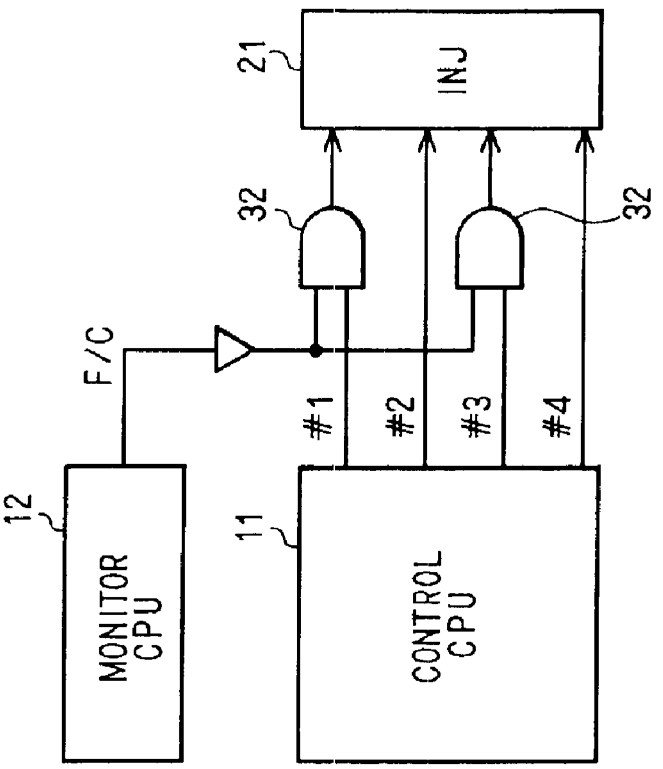

The above embodiment may be modified in many other ways. For instance, the monitor CPU 12 may be programmed to output a fuel cut-off signal F/C to all the injectors 21 through AND gates 31 as shown in FIG. 4A, when it detects a failure or abnormality in the fail-safe processing by the control CPU 11. This fuel cut-off signal prohibits fuel injection to stop engine operation.

It is also possible to apply the fuel cut-off signal F/C to the injectors 21 of only the first and third cylinders when the control CPU 11 does not perform the fail-safe processing properly, in case that the first and third cylinders are designated as the cylinders to which fuel supply is stopped if the control CPU 11 fails to perform the throttle control normally.

Further, the engine stop request flag EST in the memory 12*a* may be cleared at the time of a power circuit main relay control which is performed upon turning off the ignition switch (IGSW=OFF).

Still further, the throttle control may be performed by a first CPU separate from a second CPU which performs fuel injection and ignition controls. In this instance, the second CPU is programmed to perform the fail-safe processing if the first CPU fails to perform the throttle control normally, and the first CPU monitors the fail-safe processing of the second CPU. The first CPU is programmed to continue a fail-safe processing in place of the second CPU if the second CPU fails to perform the fail-safe processing.

The present invention should not be limited to the disclosed embodiment, but may be modified further without departing from the spirit of the invention.

What is claimed is:

1. A vehicle electronic control system comprising:

a main CPU for performing a fail-safe processing to reduce an output torque of an engine when a failure occurs in an electronic control of a vehicle; and a sub-CPU provided separately from the main CPU, wherein the sub-CPU is programmed to determine whether the fail-safe processing is performed properly by the main CPU, and performs a fail-safe processing in place of the main CPU upon determining an abnormality in the fail-safe processing of the main CPU.

2. The vehicle electronic control system as in claim 1, wherein the sub-CPU is programmed to stop the engine, as the fail-safe processing, upon determining the abnormality of the main CPU.

3. The vehicle electronic control system as in claim 2, wherein the sub-CPU is programmed to continue to reset the main CPU upon determining the abnormality in the fail-safe processing of the main CPU.

4. The vehicle electronic control system as in claim 3, wherein the sub-CPU is reset at the same time as the main CPU is reset, and the sub-CPU stores abnormality information indicative of an abnormality of the fail-safe processing of the main CPU in a non-volatile type memory and resets the main CPU based on the abnormality information.

5. The vehicle electronic control system as in claim 4, wherein the sub-CPU clears the abnormality information stored in the memory upon starting of the engine.

6. The vehicle electronic control system as in claim 4, wherein the sub-CPU clears the abnormality information stored in the memory within a predetermined delay period after turning off an ignition switch.

7. The vehicle electronic control system as claim 1, wherein the sub-CPU outputs a fuel injection stop signal to fuel injectors of the engine upon determining the abnormality in the fail-safe processing of the main CPU.

8. The vehicle electronic control system as in claim 1, wherein the main CPU performs the fail-safe processing to reduce the number of fuel injectors of the engine by which fuel is supplied to the engine, and the sub-CPU outputs a fuel injection stop signal to the fuel injectors which are held inactivated in the fail-safe processing.

9. The vehicle electronic control system as in claim 1, wherein the main CPU performs a throttle control for the engine as well as fuel injection and ignition controls for the engine as the electronic control of the vehicle.

10. The vehicle electronic control system as in claim 1, wherein:

the sub-CPU is programmed to monitor processing of a specific control performed by the main CPU and informs the main CPU of an occurrence of a failure in the processing of a specific control; and the main CPU is programmed to perform the fail-safe processing to reduce the output torque when the occurrence of a failure is notified by the sub-CPU.

11. The vehicle electronic control system as in claim 1, wherein the main CPU is programmed to perform a throttle control and perform the processing to reduce the output torque when the failure occurs in the throttle control.

12. The vehicle electronic control system as in claim 11, wherein:

the sub-CPU is programmed to monitor the throttle control performed by the main CPU and informs the main CPU of an occurrence of a failure in the throttle control; and the main CPU is programmed to perform the fail-safe processing to reduce the output torque when the occurrence of a failure is notified by the sub-CPU.

13. The vehicle electronic control system as in claim 1, wherein the fail-safe processing performed by the sub-CPU is different from the fail-safe processing to reduce an output performed by the main CPU.

14. A vehicle electronic control system comprising:

a main CPU for performing a fail-safe processing to reduce an output torque of an engine when a failure occurs in an electronic control of a vehicle; and a sub-CPU provided separately from the main CPU, wherein the sub-CPU is programmed to determine whether the fail-safe processing is performed properly by the main CPU, and performs a fail-safe processing in place of the main CPU upon determining an abnormality in the fail-safe processing of the main CPU:

the main CPU performs a throttle control for the engine as well as fuel injection and ignition controls for the engine as the electronic control of the vehicle; and the sub-CPU is programmed to monitor control operations of the main CPU, and instruct the main CPU to perform the fail-safe processing upon determining the failure in the control operations of the main CPU.

15. An electronic control method for controlling an engine by a main CPU and a sub-CPU, the method comprising:

monitoring, by the sub-CPU, normal processing for an engine performed by the main CPU;

performing, by the main CPU, first fail-safe processing to reduce engine output in place of the normal processing when the sub-CPU detects a failure in the normal processing of the main CPU;

monitoring, by the sub-CPU, the first fail-safe processing of the main CPU; and performing, by the sub-CPU, second fail-safe processing different from the first fail-safe processing when the sub-CPU detects a failure in the first fail-safe processing of the main CPU.

16. A method of controlling an engine via a control CPU and a monitor CPU, the method comprising:

performing, by the control CPU, a specific control operation;

monitoring, by the monitor CPU, the performance of the specific control operation by the control CPU;

transmitting, from the monitor CPU to the control CPU, a notification of a monitored failure in the performance of the specific control operation by the control CPU;

performing, by the control CPU, a fail-safe processing in response to receipt of the notification of the monitored failure from the monitor CPU; and monitoring, by the monitor CPU, the performance of the fail-safe processing by the control CPU.

17. The method as in claim 16, further comprising performing, by the monitor CPU, fail-safe processing if a failure in the fail-safe processing performed by the control CPU is detected during the monitoring, by the monitor CPU, of the performance of the fail-safe processing performed by the control CPU.

18. The method as in claim 17, wherein the fail-safe processing performed by the control CPU comprises reducing an engine output torque.

19. The method as in claim 16, wherein the fail-safe processing performed by the control CPU comprises reducing an engine output torque.

20. The method as in claim 16, wherein the specific control operation performed by the control CPU is a throttle control operation.

21. A vehicle control system comprising:

a control CPU that performs a specific control operation, and that performs a fail-safe processing upon receipt of a notification of a failure in the performance of the specific control operation; and a monitor CPU that monitors the performance of the specific control operation by the control CPU and transmits the notification of a failure to the control CPU upon a detection of the failure during the monitoring of the performance of the specific control operation by the control CPU, and that monitors the performance of the fail-safe processing by the control CPU.

22. The system as in claim 21, wherein the monitor CPU performs a fail-safe processing if a failure in the fail-safe processing performed by the control CPU is detected during monitoring by the monitor CPU of the performance of the fail-safe processing performed by the control CPU.

23. The system as in claim 22, wherein the fail-safe processing performed by the control CPU comprises reducing an engine output torque.

24. The system as in claim 21, wherein the fail-safe processing performed by the control CPU comprises reducing an engine output torque.

25. The system as in claim 21, wherein the specific control operation performed by the control CPU is a throttle control operation.

26. A vehicle electronic control system comprising:

a main CPU for performing a specific control operation of an engine and performing fail-safe processing, different than the specific control operation, to reduce an output torque of the engine when a failure occurs in the specific control operation of the engine; and a sub-CPU provided separately from the main CPU, wherein the sub-CPU is programmed to determine whether the fail-safe processing is performed properly by the main CPU, and performs a fail-safe processing in place of the main CPU upon determining an abnormality in the fail-safe processing of the main CPU.

27. A vehicle electronic control system comprising:

a main CPU for performing a fail-safe processing to reduce an output torque of an engine when a failure occurs in an electronic control of a vehicle; and a sub-CPU provided separately from the main CPU, wherein the sub-CPU is programmed to determine whether the fail-safe processing is performed properly by the main CPU, and performs a fail-safe processing in place of the main CPU upon determining an abnormality in the fail-safe processing of the main CPU; and the sub-CPU is programmed to monitor control operations of the main CPU, and instruct the main CPU to perform the fail-safe processing upon determining the failure in the control operations of the main CPU.

* * * * *

UNITED STATES PATENT AND TRADEMARK OFFICE

CERTIFICATE OF CORRECTION

PATENT NO. : 6,892,129 B2 
DATED : May 10, 2005
INVENTOR(S) : Miyano et al.

It is certified that error appears in the above-identified patent and that said Letters Patent is hereby corrected as shown below:

Title page,
Item [75], Inventors, add -- Tsutomu Miyazaki, Aichi-ken (JP) --.

Signed and Sealed this

Twenty-fifth Day of October, 2005

JON W. DUDAS
*Director of the United States Patent and Trademark Office*